(12) United States Patent
Vigen

(10) Patent No.: US 12,397,694 B1
(45) Date of Patent: Aug. 26, 2025

(54) GRAB HANDLES FOR VEHICLES

(71) Applicant: Arctic Cat Inc., Thief River Falls, MN (US)

(72) Inventor: David L. Vigen, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 18/669,868

(22) Filed: May 21, 2024

(51) Int. Cl.
*B60N 3/02* (2006.01)
*B62M 27/02* (2006.01)

(52) U.S. Cl.
CPC ............. *B60N 3/026* (2013.01); *B62M 27/02* (2013.01)

(58) Field of Classification Search
CPC ....... B60N 3/026; B62M 27/02; B62K 21/125
See application file for complete search history.

(56) References Cited

U.S. PATENT DOCUMENTS

| | | |
|---|---|---|
| 5,064,157 A | 11/1991 | O'Neal |
| 5,239,884 A | 8/1993 | Norsen |
| 6,363,812 B1 | 4/2002 | Yamamura |
| D621,299 S | 8/2010 | Longnecker |
| 8,695,744 B1 | 4/2014 | Bedard et al. |
| 9,428,232 B2 | 8/2016 | Ripley et al. |
| 9,610,986 B2 | 4/2017 | Conn |
| 9,649,928 B2 | 5/2017 | Danielson et al. |
| 9,796,437 B2 | 10/2017 | Wilson et al. |
| 11,001,131 B2 | 5/2021 | Letendre |
| 11,110,994 B2 | 9/2021 | Hedlund et al. |
| 11,235,634 B2 | 2/2022 | Lavallee et al. |
| 2009/0314126 A1 | 12/2009 | Longnecker |

FOREIGN PATENT DOCUMENTS

| | | | |
|---|---|---|---|
| AT | 413686 B | * 3/2006 | ........... B62K 21/125 |
| CN | 102700670 A | * 10/2012 | |

OTHER PUBLICATIONS

Deep Snow Low Grab Handle; https://www.brppac.com/brp-860201975.html; Accessed Jan. 31, 2023.

* cited by examiner

*Primary Examiner* — Daniel D Yabut
(74) *Attorney, Agent, or Firm* — Lawrence Youst PLLC

(57) ABSTRACT

A steering system for a vehicle includes a steering column and a handlebar riser. The handlebar riser is coupled to the top end of the steering column and defines an internal channel. The steering system also includes a grab handle including a closed loop and a base coupled to the bottom end of the closed loop. The base is insertable into the internal channel of the handlebar riser. The steering system also includes handlebars coupled to the top end of the handlebar riser over the base of the grab handle, thereby securing the grab handle to the handlebar riser.

20 Claims, 12 Drawing Sheets

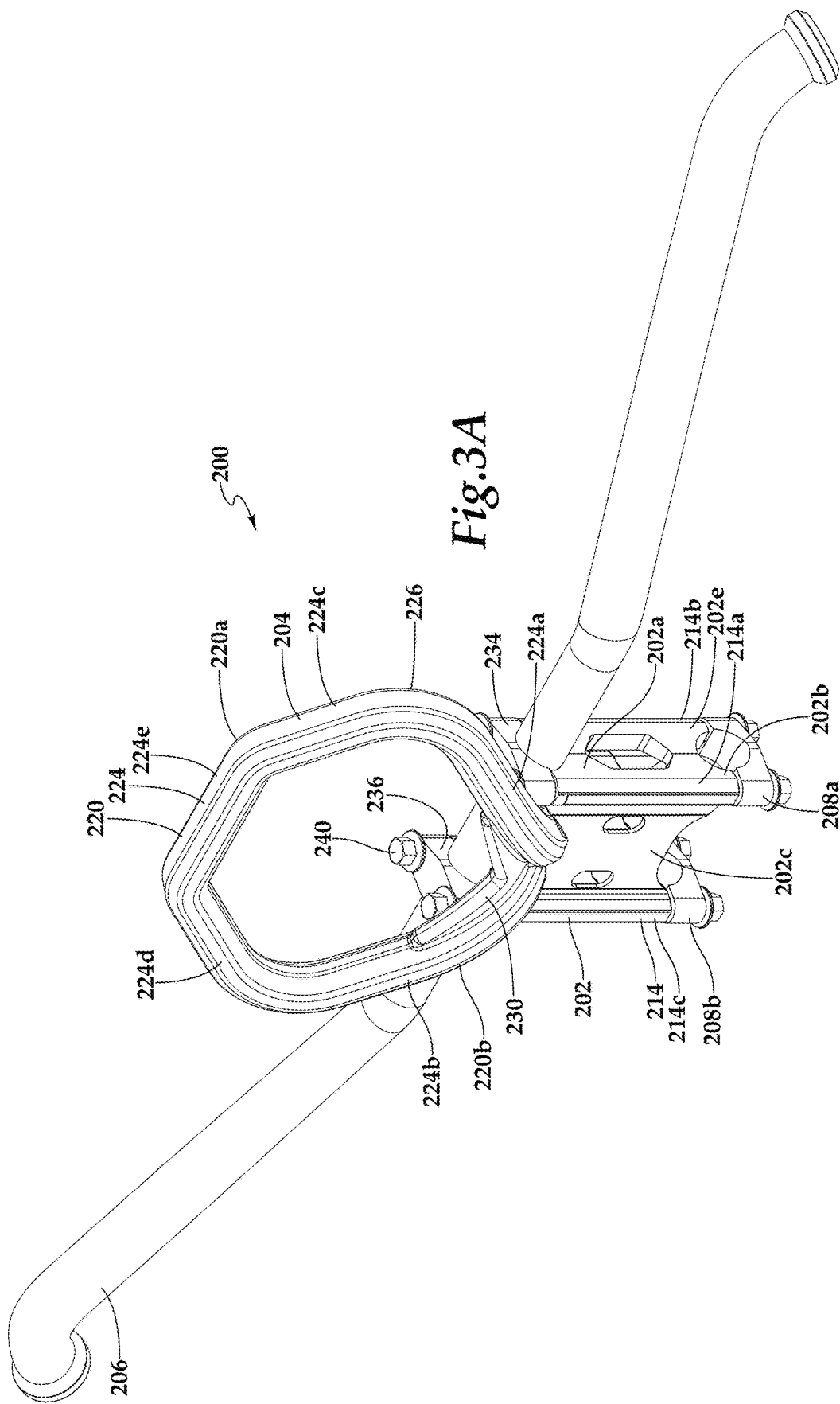

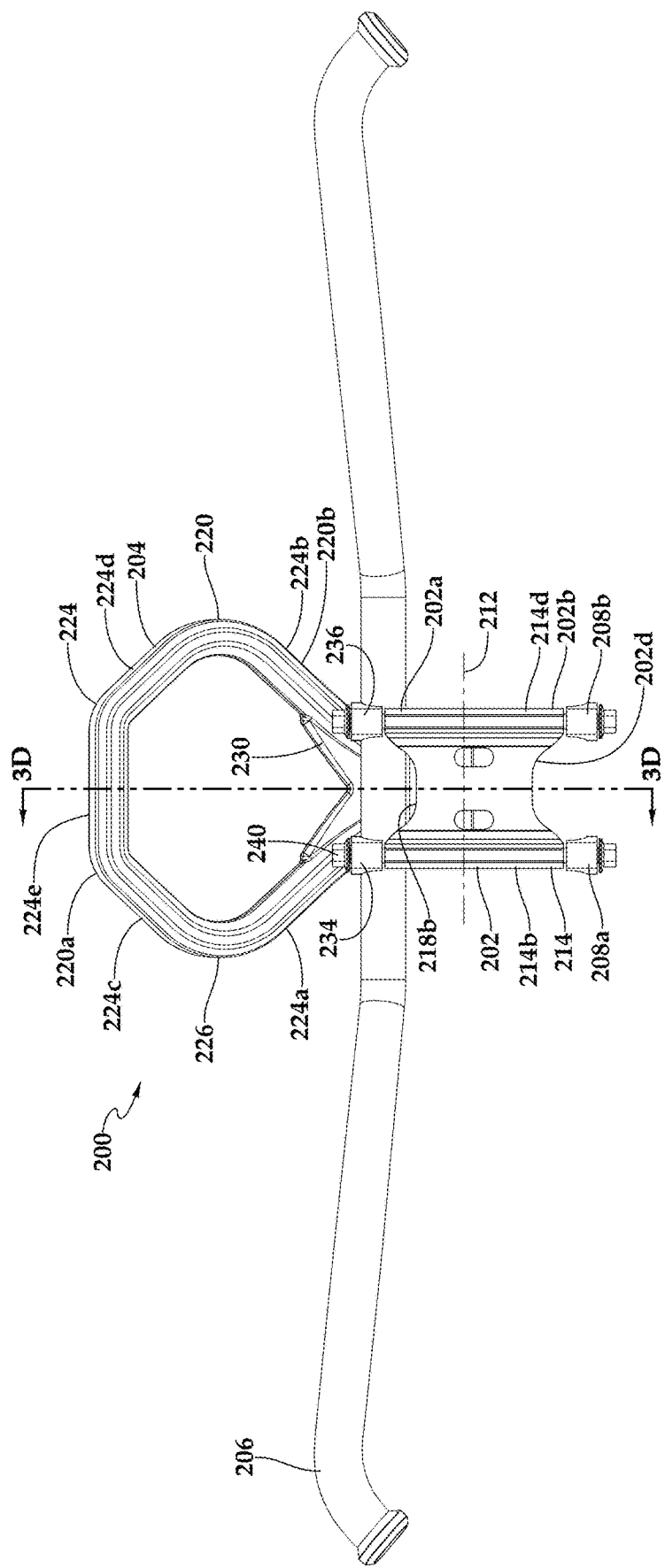

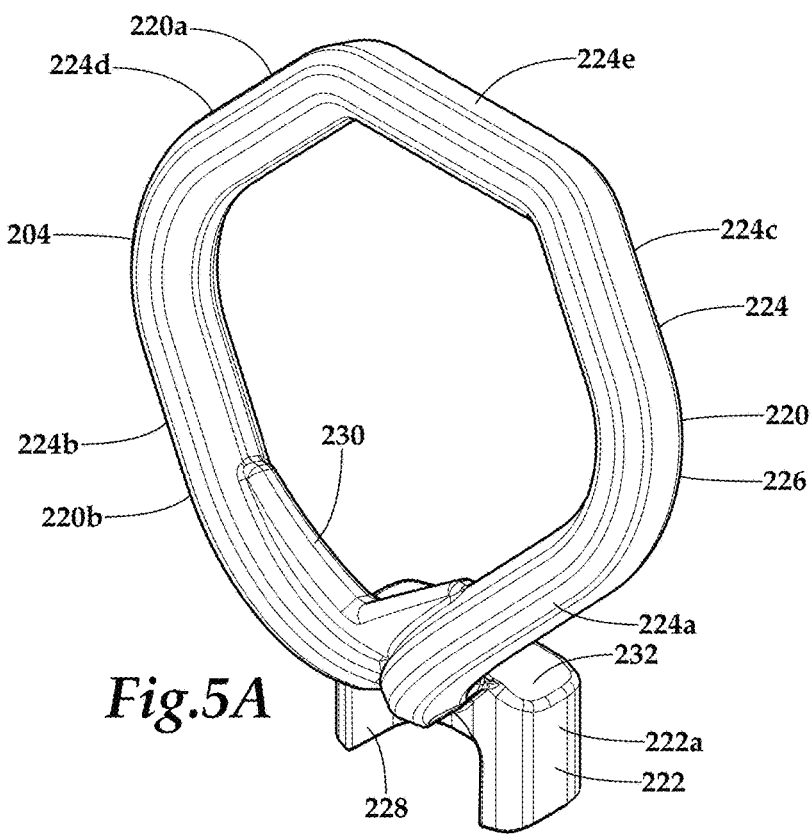
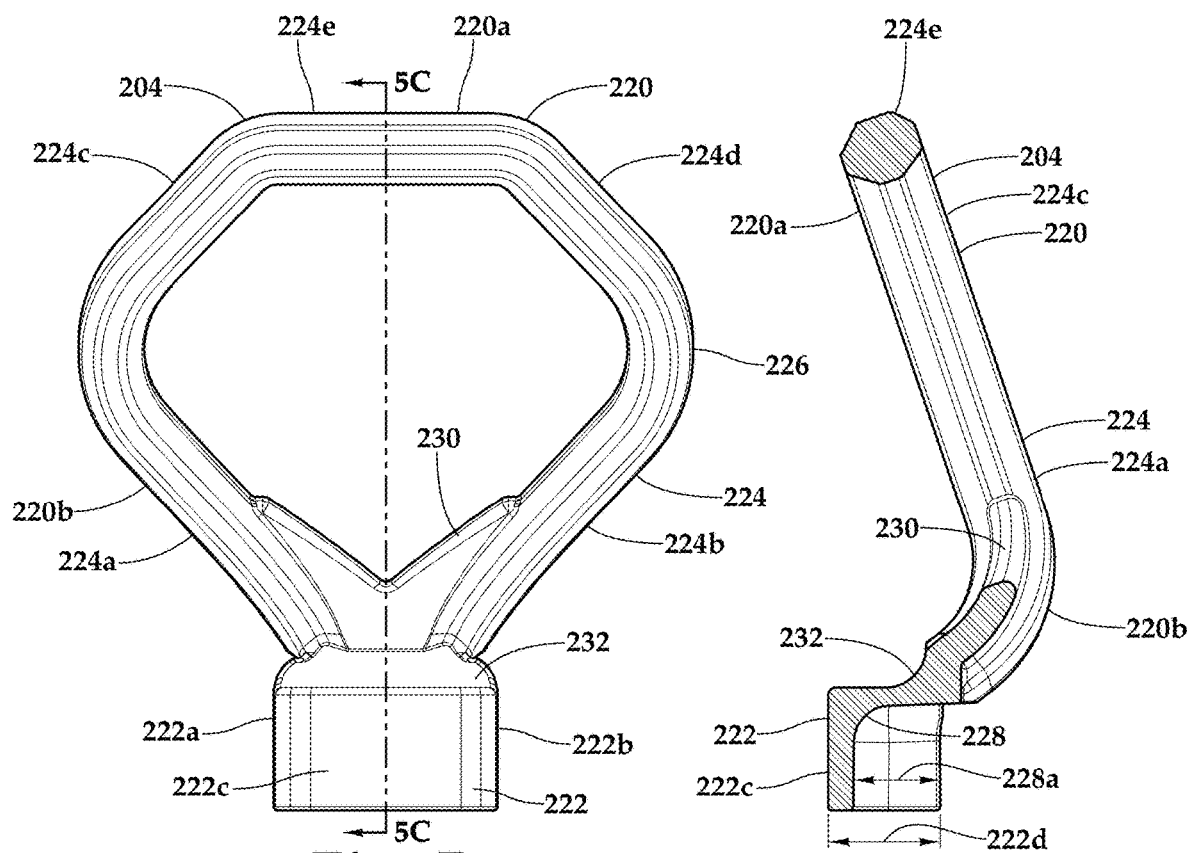
Fig.5A Fig.5B Fig.5C

GRAB HANDLES FOR VEHICLES

TECHNICAL FIELD OF THE DISCLOSURE

The present disclosure relates, in general, to steering systems for vehicles and, in particular, to grab handles mounted adjacent to the handlebars of a vehicle, the grab handle including a closed loop onto which an operator of the vehicle may grasp for added stability during various vehicle maneuvers.

BACKGROUND

Snowmobiles are popular land vehicles used for transportation and recreation in cold and snowy conditions. Certain snowmobiles are designed for specific applications such as trail, utility, mountain, race and crossover applications, to name a few. Snowmobiles typically include a frame assembly, or chassis, that supports various components of the snowmobile such as an engine, a transmission, a steering system and a ground-engaging endless drive track disposed in a longitudinally extending tunnel. The engine and transmission power the drive track to enable ground propulsion for the vehicle. A rider controls the operation of the snowmobile using the steering system including a handlebar assembly that is operatively linked to a pair of ski assemblies that provides flotation for the front end of the snowmobile over the snow.

To provide additional stability for the rider, snowmobiles as well as other land vehicles may include a grab handle, also known as a grab bar, mountain strap or mountain handle. Grab handles may be mounted on or near the handlebars so that the rider may grasp the grab handle with one hand for stability while continuing to grasp the handlebars with the other hand for steering control. Alternatively, grab handles may also be found on the rear of the vehicle, near the seat or on the side of the vehicle for easy access. In one example application, grab handles are commonly installed on snowmobiles for use in deep snow or mountainous terrain to provide a sturdy and secure handle for riders to hold onto while standing on the vehicle and navigating steep inclines or performing maneuvers such as sidehilling, thereby keeping the rider vertical when the snowmobile is tilted. Some vehicles have a pre-installed grab handle, while for other vehicles a grab handle is installed after initial vehicle assembly. Current grab handles are either fastened directly to the handlebars or require additional parts, increasing the complexity, cost and time required to remove or install the grab handle. Relying solely on a direct connection between the grab handle and the handlebars may also lessen the stability of the grab handle, especially when loaded with the weight of the rider. Accordingly, a need has arisen for grab handles that are conveniently removable from and installable on a vehicle while providing enhanced stability to withstand high loads when utilized in challenging terrain.

SUMMARY

In a first aspect, the present disclosure is directed to a steering system for a vehicle including a steering column and a handlebar riser. The handlebar riser is coupled to the top end of the steering column and defines an internal channel. The steering system also includes a grab handle including a closed loop and a base coupled to the bottom end of the closed loop. The base is insertable into the internal channel of the handlebar riser. The steering system also includes handlebars coupled to the top end of the handlebar riser over the base of the grab handle, thereby securing the grab handle to the handlebar riser.

In some embodiments, the grab handle may be formed from an elastomer such as a thermoplastic elastomer. In certain embodiments, the closed loop of the grab handle may protrude from the front side of the handlebar riser. In some embodiments, the closed loop of the grab handle may have a tilted configuration such that the upper section of the closed loop is aft of the lower section of the closed loop. In certain embodiments, the closed loop of the grab handle may have a lower section having a curved profile extending forward from the base of the grab handle and curving aftward toward an upper section of the closed loop. In some embodiments, the closed loop of the grab handle may include a flat top segment. In such embodiments, the flat top segment may be substantially parallel to the handlebars. In certain embodiments, the closed loop of the grab handle may have a lower section forward of the handlebars. In some embodiments, the closed loop of the grab handle may have a lower section including a support webbing. In certain embodiments, the closed loop of the grab handle may be formed from a number of segments including left and right diagonal lower segments having bottom ends converging to the base of the grab handle, left and right diagonal upper segments having bottom ends coupled to top ends of the left and right diagonal lower segments, respectively, and a top segment. In such embodiments, the top ends of the diagonal upper segments may converge to the top segment. In some embodiments, the closed loop of the grab handle may be formed from a number of segments each having a polygonal cross-sectional shape.

In certain embodiments, the base of the grab handle may have a top side defining a groove curved to contour the bottom side of the handlebars. In some embodiments, the base of the grab handle may define a cavity. In certain embodiments, the steering system may include one or more clamps coupled to the top end of the handlebar riser such that the handlebars are interposed between the one or more clamps and the handlebar riser. In some embodiments, each clamp may have a bottom side curved to contour the top side of the handlebars. In certain embodiments, the top end of the handlebar riser may define one or more left fastener holes and one or more right fastener holes and the one or more clamps may include a left clamp and a right clamp each defining one or more fastener holes. In such embodiments, the steering system may include one or more left fasteners insertable through the one or more fastener holes of the left clamp and the one or more left fastener holes of the handlebar riser and one or more right fasteners insertable through the one or more fastener holes of the right clamp and the one or more right fastener holes of the handlebar riser, thereby coupling the clamps to the top end of the handlebar riser.

In a second aspect, the present disclosure is directed to a snowmobile including a forward frame assembly and a steering system coupled to the forward frame assembly. The steering system includes a steering column and a handlebar riser. The handlebar riser is coupled to the top end of the steering column and defines an internal channel. The steering system also includes a grab handle including a closed loop and a base coupled to the bottom end of the closed loop. The base is insertable into the internal channel of the handlebar riser. The steering system also includes handlebars coupled to the top end of the handlebar riser over the base of the grab handle, thereby securing the grab handle to the handlebar riser.

In some embodiments, the grab handle including the closed loop and the base may be a monolithic component. In certain embodiments, the grab handle may be formed from an injection molded polymer. In some embodiments, the closed loop of the grab handle may include a top segment substantially vertically aligned with the base of the grab handle and the handlebars such that the top segment, the base and the handlebars lie along a common lateral plane.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 3A-3D are various views of a handlebar assembly for a snowmobile steering system having a grab handle in accordance with embodiments of the present disclosure;

FIGS. 5A-5C are various views of a grab handle in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
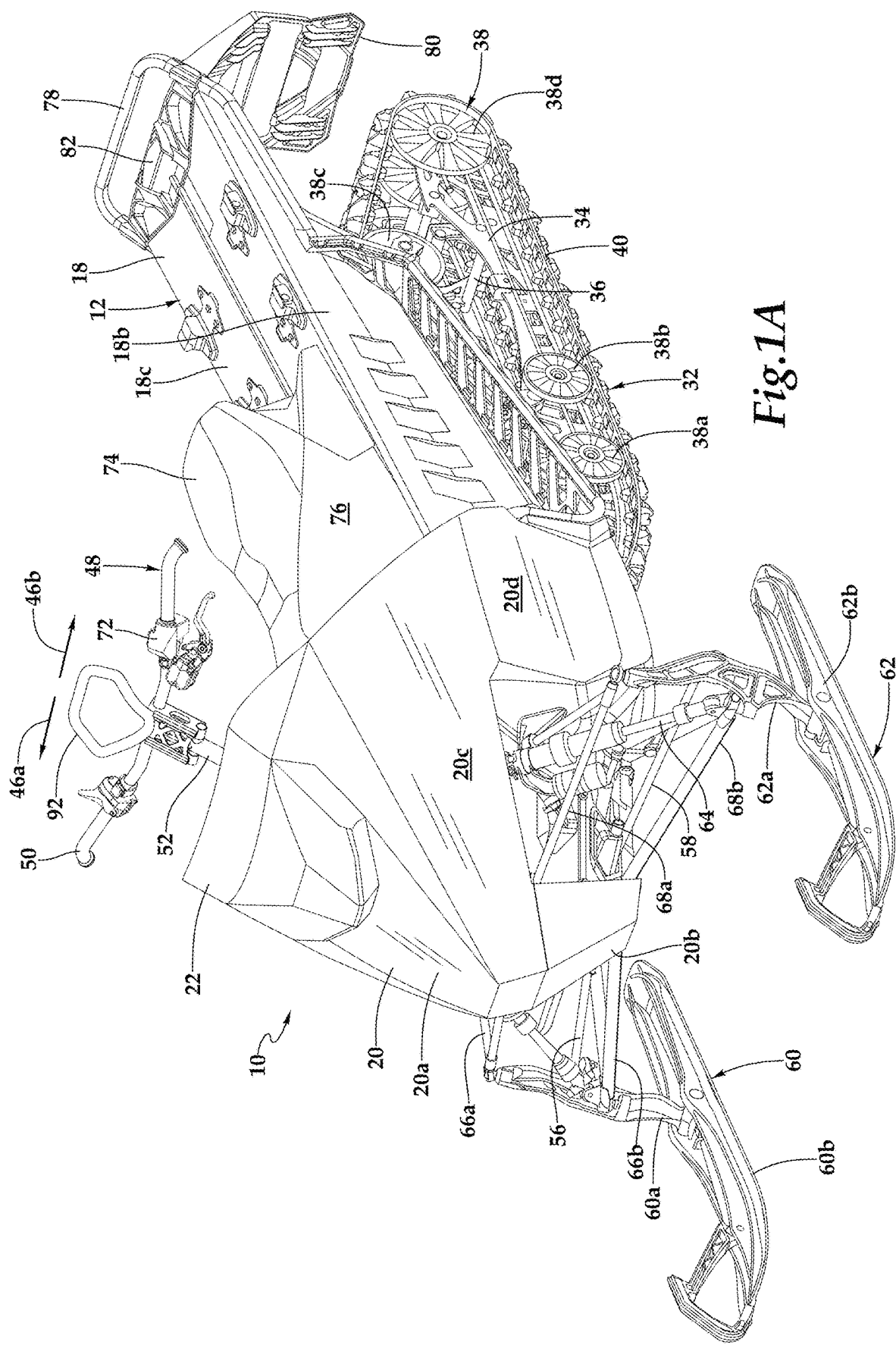
FIGS. 1A-1C are isometric and side views of a snowmobile having a grab handle in accordance with embodiments of the present disclosure.
Figure 1B:
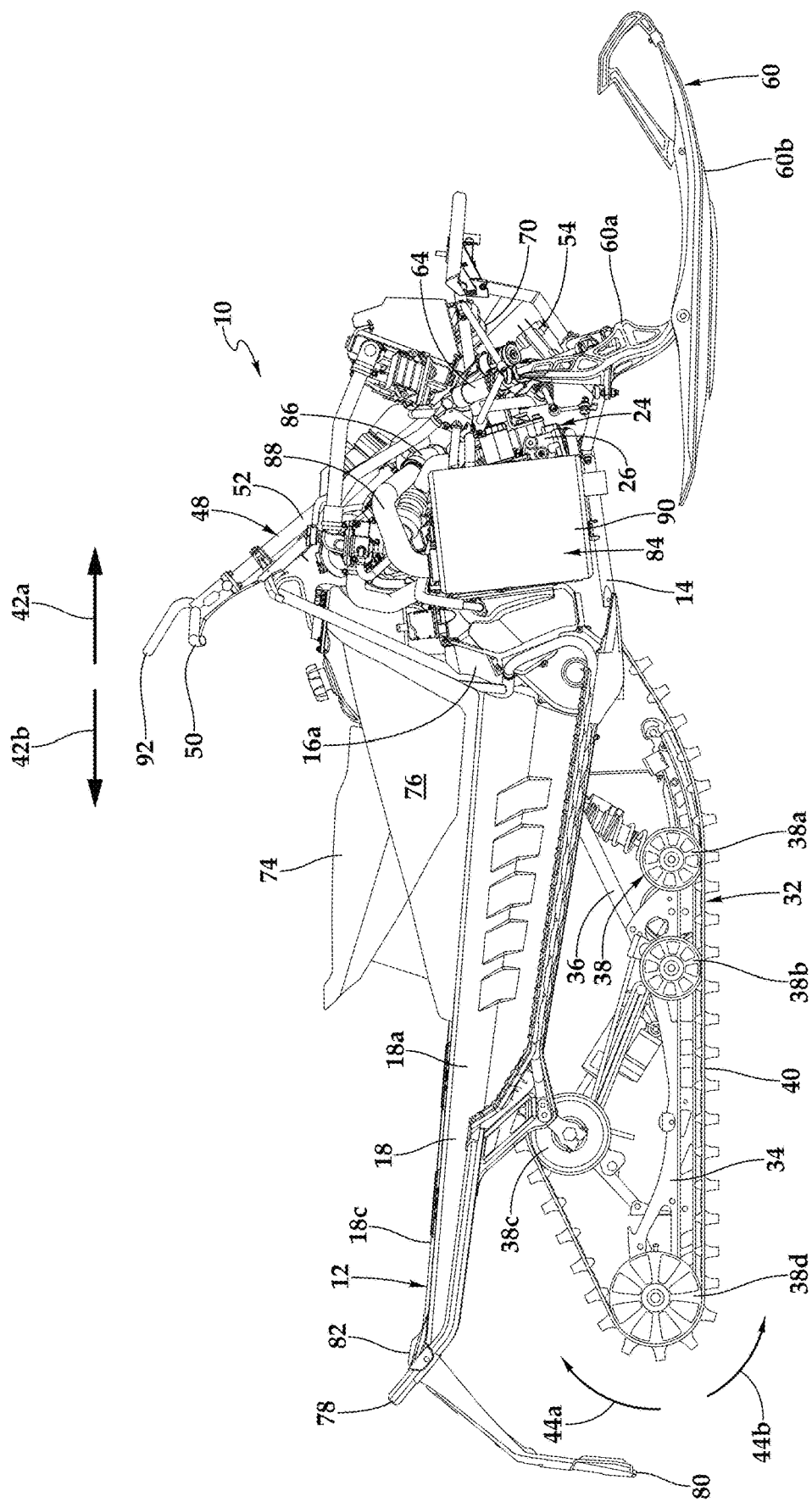
Figure 1C:
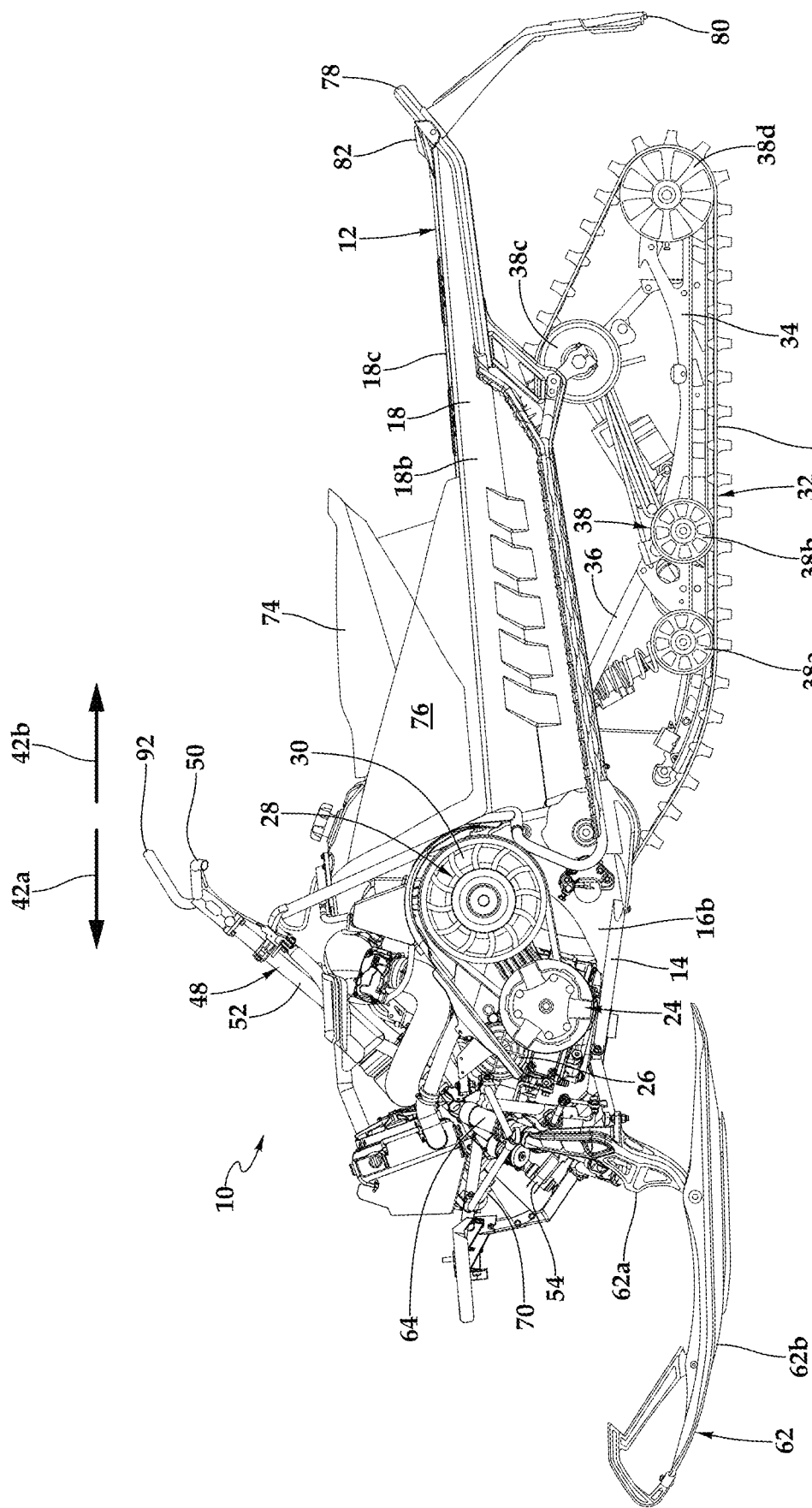

Referring to FIGS. 1A-1C in the drawings, a land vehicle depicted as a snowmobile is schematically illustrated and generally designated 10. Structural support for snowmobile 10 is provided by a chassis 12 that includes a forward frame assembly 14 and a longitudinally extending tunnel 18. Forward frame assembly 14 may be formed from interconnected tubular members such as round and hollow tubular members comprised of metal, metal alloy, polymeric materials, fiber reinforced polymer composites and/or combinations thereof that are coupled together by welds, bolts, pins or other suitable fastening means. A right side plate member 16a and a left side plate member 16b are coupled to and preferably welded to forward frame assembly 14 such that forward frame assembly 14 and plate members 16a, 16b form a welded frame assembly. Tunnel 18 is coupled to forward frame assembly 14 and/or plate members 16a, 16b with welds, bolts, rivets or other suitable means. In the illustrated embodiment, tunnel 18 includes a right sidewall 18a, a left sidewall 18b and a top panel 18c. Tunnel 18 may be integrally formed or may consist of multiple members that are coupled together with welds, bolts, rivets or other suitable means. Plate members 16a, 16b and tunnel 18 may be formed from sheet metal, metal alloy, fiber reinforced polymer or other suitable material or combination of materials.

Various components of snowmobile 10 are assembled on or around forward frame assembly 14. One or more body panels 20 cover and protect the various components of snowmobile 10 including parts of forward frame assembly 14. For example, a hood panel 20a, a nose panel 20b, an upper left side panel 20c and a lower left side panel 20d shield underlying componentry from snow and terrain. Similarly, an upper right side panel and a lower right side panel (not visible) also shield underlying componentry from snow and terrain. In the illustrated embodiment, snowmobile 10 has a windshield 22 that shields the rider of snowmobile 10 from snow, terrain and frigid air during operation. Even through snowmobile 10 has been described and depicted as including specific body panels 20, it should be understood by those having ordinary skill in the art that a snowmobile of the present disclosure may include any number of body panels in any configuration to provide the shielding functionality. In addition, it should be understood by those having ordinary skill in the art that the right side and the left side of snowmobile 10 will be with reference to a seated rider of snowmobile 10 with the right side of snowmobile 10 corresponding to the right side of the rider and the left side of snowmobile 10 corresponding to the left side of the rider.

Body panels 20 as well as other components have been removed from snowmobile 10 in FIGS. 1B-1C to reveal the underlying components of snowmobile 10. For example, snowmobile 10 has a powertrain 24 that includes an engine 26 and a drivetrain 28, both of which are coupled to forward frame assembly 14. Engine 26 resides in a bay formed within forward frame assembly 14 of chassis 12. Engine 26 may be any type of engine such as a four-stroke engine, a two-stroke engine, an electric motor or other prime mover. In the illustrated embodiment, engine 26 is an internal combustion engine such as a naturally aspirated internal combustion engine or a forced induction internal combustion engine that includes, for example, one or more turbochargers and/or superchargers. Drivetrain 28 includes a transmission depicted as a continuously variable transmission 30 that varies the ratio of the engine output speed to the drive track input speed. In other embodiments, the transmission for snowmobile 10 may be an electrically variable transmission or other suitable transmission type. A drive track system 32 is at least partially disposed within and/or below tunnel 18 and is in contact with the ground to provide ground propulsion for snowmobile 10. Torque and rotational energy are provided to drive track system 32 from powertrain 24. Drive track system 32 includes a track frame 34, an internal suspension 36, a plurality of idler wheels 38 such as idler wheels 38a, 38b, 38c, 38d and an endless track 40. Track frame 34 may be coupled to forward frame assembly 14 via a swing arm having a coil spring, a rigid strut, a torsion spring, an elastomeric member or any other suitable coupling configuration. Endless track 40 is driven by a track drive sprocket via a track driveshaft (not visible) that is rotated responsive to torque provided from continuously variable transmission 30. Endless track 40 rotates around track frame 34 and idler wheels 38 to propel snowmobile 10 in either the forward direction, as indicated by arrow 42a, or the backward direction, as indicated by arrow 42b. When viewed from the right side of snowmobile 10, endless track 40 rotates around track frame 34 and idler wheels 38 in the clockwise direction, as indicated by arrow 44a, to propel snowmobile 10 in forward direction 42a. Endless track 40 rotates around track frame 34 and idler wheels 38 in the counterclockwise direction, as indicated by arrow 44b, to propel snowmobile 10 in backward direction 42b. Forward and backward directions 42a, 42b also represent the longitudinal direction of snowmobile 10 with the lateral direction of snowmobile 10 being normal thereto and represented by the rightward direction, as indicated by arrow 46a, and the leftward direction, as indicated by arrow 46b in FIG. 1A. The backward direction may also be referred to herein as the aftward direction.

Snowmobile 10 has a steering system 48 that includes a handlebar assembly 50, a steering column 52, a steering arm assembly 54, a right tie rod 56, a left tie rod 58, a right ski assembly 60 including a right spindle 60a and a right ski 60b and a left ski assembly 62 including a left spindle 62a and a left ski 62b. Right ski assembly 60 and left ski assembly 62 may be referred to collectively as the ski system of snowmobile 10. Snowmobile 10 has a front suspension assembly 64 that is coupled between forward frame assembly 14 and ski assemblies 60, 62 to provide front end support for snowmobile 10. In addition, right ski assembly 60 is coupled to forward frame assembly 14 by upper and lower A-arms 66a, 66b, and left ski assembly 62 is coupled to forward frame assembly 14 by upper and lower A-arms 68a, 68b. Steering system 48 enables the rider to steer snowmobile 10 by rotating handlebar assembly 50, which causes ski assemblies 60, 62 to pivot. In the illustrated embodiment, the pivoting of ski assemblies 60, 62 responsive to rotation of handlebar assembly 50 is assisted by an electric power steering system (EPS) depicted as electronic steering assist unit 70. Handlebar assembly 50 includes handlebars controls 72 that allow the rider to control various functions of snowmobile 10 such as braking and lighting functions.

The rider controls snowmobile 10 from a seat 74 that is positioned atop a fuel tank 76, above tunnel 18, aft of handlebar assembly 50 and aft of forward frame assembly 14. Snowmobile 10 has a lift bumper 78 that is coupled to an aft end of tunnel 18 that enables a person to lift the rear end of snowmobile 10 in the event snowmobile 10 becomes stuck or needs to be repositioned when it is not moving. Snowmobile 10 has a snow flap 80 that deflects snow emitted by endless track 40. A taillight housing 82 is also coupled to lift bumper 78 and houses a taillight of snowmobile 10. Snowmobile 10 has an exhaust system 84 that includes an exhaust manifold 86 that is coupled to one or more exhaust outlets on engine 26, an exhaust duct 88 and a muffler 90. As exhaust system 84 including exhaust manifold 86 is coupled to the forward side of engine 26, the forward side of engine 26 may be referred to as the hot side of engine 26 due to the hot temperatures associated with engine exhaust. The aftward side of engine 26 is concomitantly considered the cool side of engine 26 as hot exhaust system components are located opposite and/or remote therefrom.

To provide additional stability for the rider, snowmobile 10 as well as other land vehicles may include a grab handle. Grab handles may be mounted on or near the handlebars so that the rider may grasp the grab handle with one hand for stability while continuing to grasp the handlebars with the other hand for steering control. For example, grab handles are commonly installed on snowmobiles for use in deep snow or mountainous terrain to provide a sturdy and secure handle for riders to hold onto while standing on the vehicle and navigating steep inclines or performing maneuvers such as sidehilling, thereby keeping the rider vertical when the snowmobile is tilted. Some vehicles have a pre-installed grab handle, while for other vehicles a grab handle is installed after initial vehicle assembly. Current grab handles are either fastened directly to the handlebars or require additional parts, increasing the complexity, cost and time required to remove or install the grab handle. Relying solely on a direct connection between the grab handle and the handlebars may also lessen the stability of the grab handle, especially when loaded with the weight of the rider. To address these and other issues with current grab handles, steering system 48 of snowmobile 10 includes a grab handle 92 as described in the illustrative embodiments herein.

It should be appreciated that snowmobile 10 is merely illustrative of a variety of vehicles that can implement the embodiments disclosed herein. Indeed, grab handle 92 may be implemented on any ground-based vehicle. Other vehicle implementations can include motorcycles, snow bikes, all-terrain vehicles (ATVs), utility vehicles, recreational vehicles, scooters, automobiles, mopeds, straddle-type vehicles, jet skis and the like. As such, those skilled in the art will recognize that grab handle 92 can be integrated into a variety of vehicle configurations. It should be appreciated that even though ground-based vehicles are particularly well-suited to implement the embodiments of the present disclosure, airborne vehicles and devices such as aircraft can also implement the embodiments.

Figure 2A:
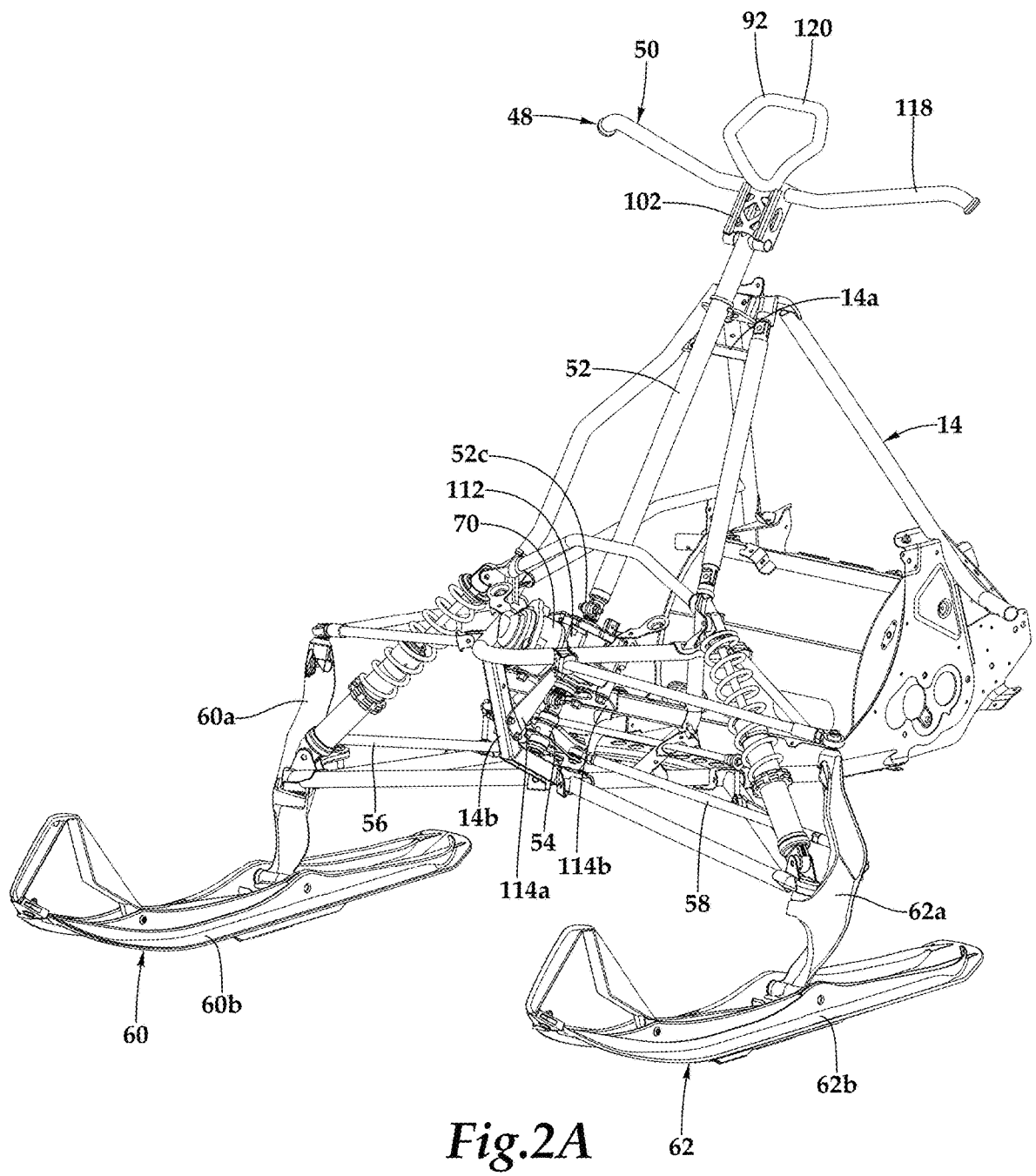
FIGS. 2A-2C are various views of a steering system for a snowmobile having a grab handle in accordance with embodiments of the present disclosure.
Figure 2B:
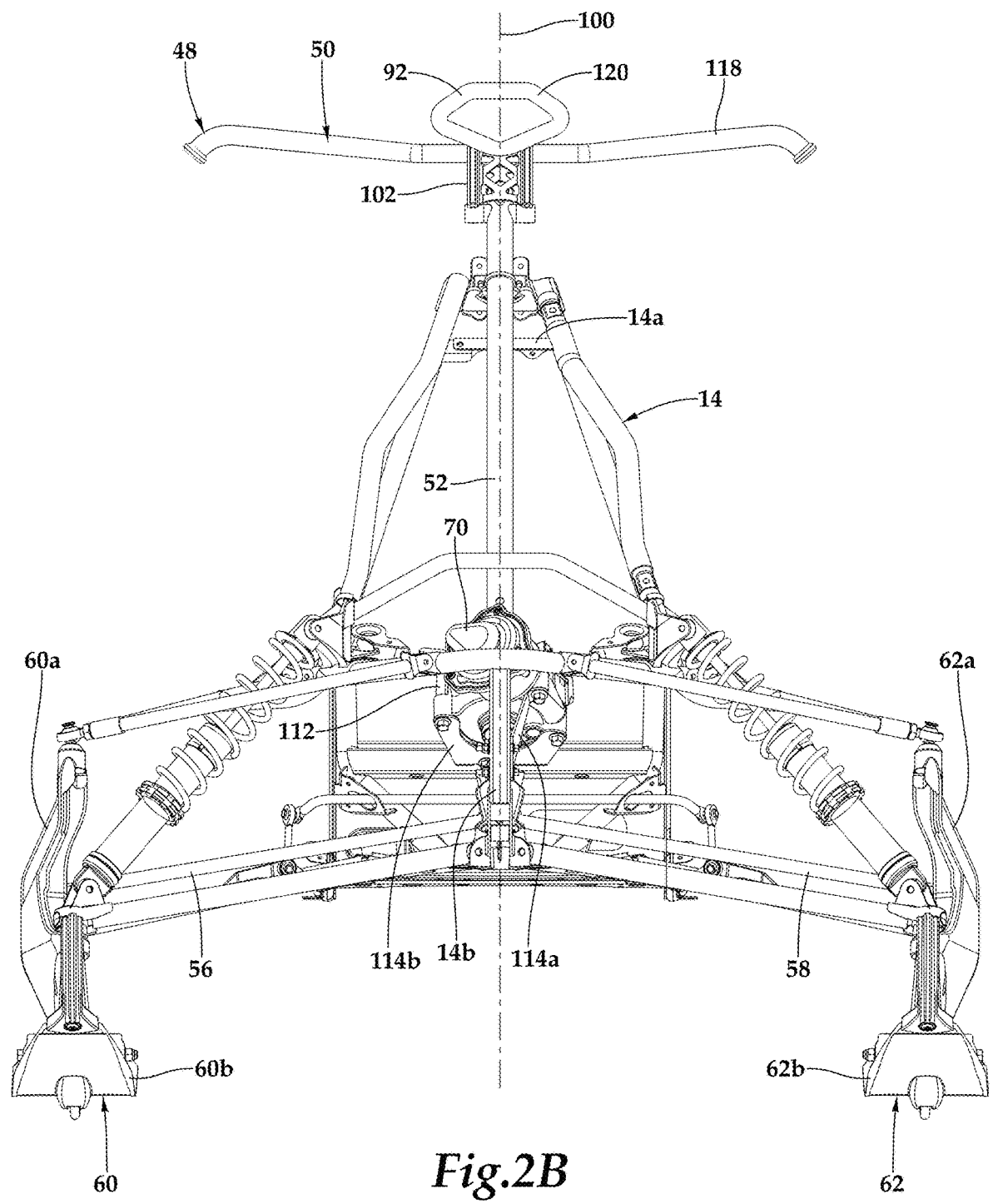
Figure 2C:
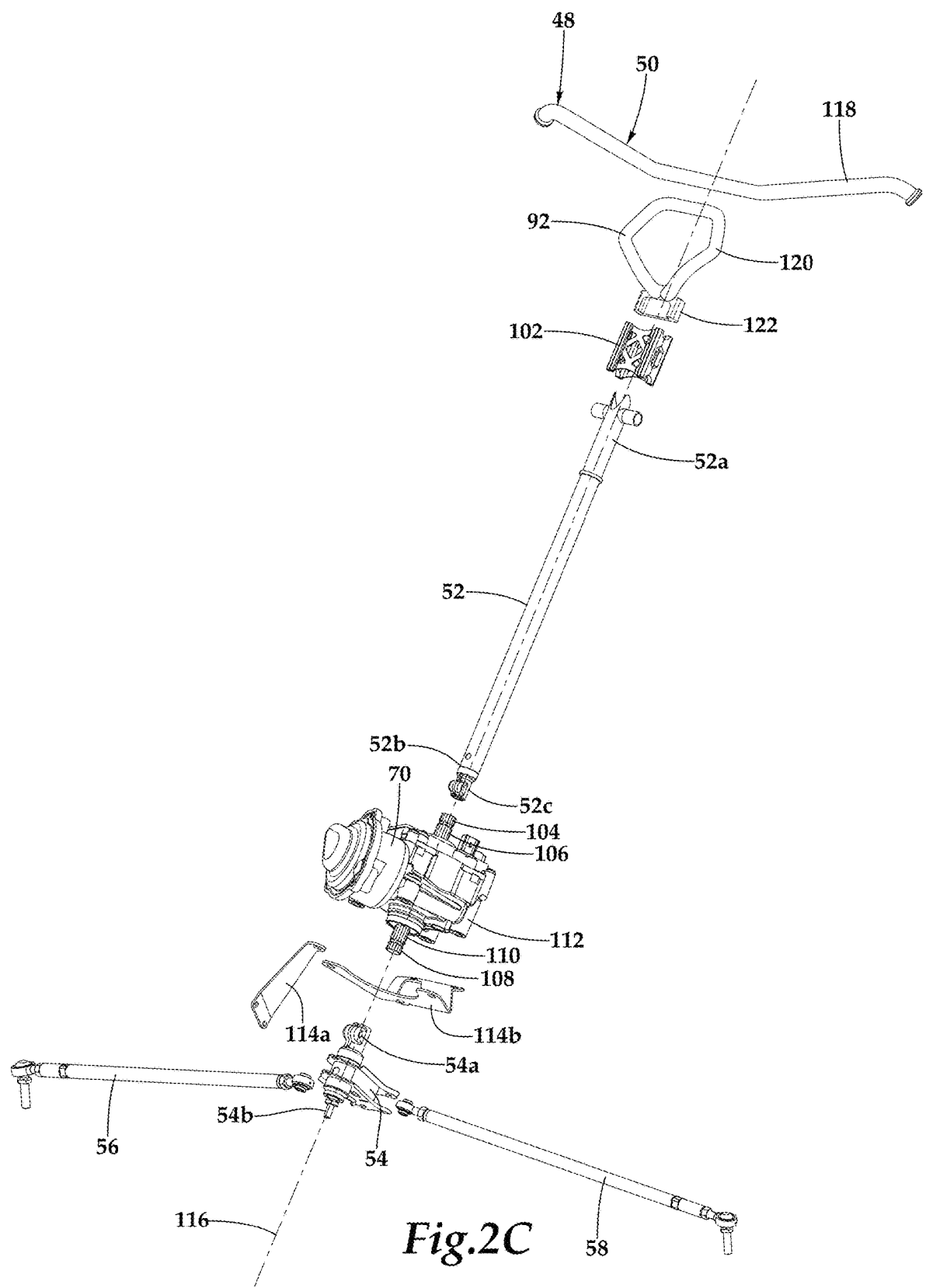

Referring additionally to FIGS. 2A-2C in the drawings, further details relating to steering system 48 of snowmobile 10 will now be disclosed. As discussed herein, steering system 48 includes handlebar assembly 50, steering column 52, steering arm assembly 54, right tie rod 56, left tie rod 58, right ski assembly 60 including right spindle 60a and right ski 60b, and left ski assembly 62 including left spindle 62a and left ski 62b. In addition, steering system 48 includes electronic steering assist unit 70. In the illustrated embodiment, steering column 52 is a straight steering column formed as a non-segmented single post that is positioned forward of upper cross member 14a and along a centerline 100 of snowmobile 10. In other embodiments, the steering column may be a segmented straight steering column that has upper and lower posts, a bent steering column including, for example, a universal joint between upper and lower posts, an articulated steering column that has multiple posts routed around other snowmobile components using multiple joints, a laterally offset steering column that extends downwardly, forwardly and laterally from handlebar assembly 50 to the lower steering assembly or other suitable connection between handlebar assembly 50 and the lower steering assembly. As best seen in FIG. 2C, steering column 52 has a top end 52a and a bottom end 52b. Top end 52a of steering column 52 is coupled to handlebar riser 102 of handlebar assembly 50. Bottom end 52b of steering column 52 includes a splined coupler 52c that may be integral with or coupled to bottom end 52b of steering column 52. Splined coupler 52c receives an input shaft 104 having input splines 106 thereon to couple lower end 52b of steering column 52 to electronic steering assist unit 70. Steering arm assembly 54 includes a splined coupler 54a that receives an output shaft 108 having output splines 110 thereon such that electronic steering assist unit 70 is coupled directly to steering arm assembly 54 without a steering column post or other extension positioned therebetween. In other embodiments, a steering column post or other extension may be positioned between electronic steering assist unit 70 and steering arm assembly 54. Steering arm assembly 54 is coupled to the proximal ends of tie rods 56, 58. The distal ends of tie rods 56, 58 are respectively coupled to ski assemblies 60, 62 such that rotation of handlebar assembly 50 by the rider of snowmobile 10, together with the assistance of electronic steering assist unit 70, causes ski assemblies 60, 62 to pivot, thus turning snowmobile 10. A lower end 54b of steering arm assembly 54 is received within a bearing assembly (not visible) of nose truss 14b such that steering arm assembly 54 is operable to rotate relative thereto.

Electronic steering assist unit 70 includes an outer housing 112 that contains the working components thereof including, for example, an electric motor, a torque sensor, a controller and a torsion bar that couples input shaft 104 to output shaft 108. In other embodiments, an electronic steering assist unit may have an alternate shaft configuration including, for example, a single piece shaft design. Outer housing 112 is fixed against rotation relative to forward frame assembly 14 by brackets 114a, 114b. In operation, the input torque applied from handlebar assembly 50 via steering column 52 on input shaft 104 is measured by the torque sensor. Input torque data is then provided to the controller from the torque sensor. Based upon the input torque data and additional factors such as the speed of snowmobile 10, the controller commands the electric motor to provide an output assist torque to output shaft 108 that is additive to the input torque applied to output shaft 108 from input shaft 104 via the torsion bar. The use of electronic steering assist unit 70 improves the handling of snowmobile 10, reduces fatigue associated with driving snowmobile 10 and can allow snowmobile 10 to be driven more aggressively. In addition, coupling electronic steering assist unit 70 directly to steering arm assembly 54 has numerous advantages over prior snowmobile steering systems that have electronic steering assist units including lowering the center of gravity of snowmobile 10 by positioning the electronic steering assist unit at a lowermost location of the steering column. In addition, coupling electronic steering assist unit 70 directly to steering arm assembly 54, together with using a straight steering column 52 and having a common axis of rotation 116 shared by handlebar assembly 50, steering column 52, electronic steering assist unit 70 and steering arm assembly 54 that is positioned along centerline 100 (see FIG. 2B) of snowmobile 10, reduces the number of parts required in steering system 48 and reduces the complexity of steering system 48, which improves the overall reliability of snowmobile 10. Handlebar assembly 50 includes handlebar riser 102, grab handle 92 and handlebars 118. Handlebars 118 are coupled to the top end of handlebar riser 102. Grab handle 92 includes a closed loop 120 with a base 122 that slides into an internal channel defined by handlebar riser 102 when handlebars 118 are removed from handlebar riser 102. When handlebars 118 are coupled to the top end of handlebar riser 102, base 122 of grab handle 92 is securely locked into the internal channel of handlebar riser 102 so that closed loop 120 provides a stable point onto which a rider of snowmobile 10 may grasp when navigating challenging terrain.

Figure 3C:
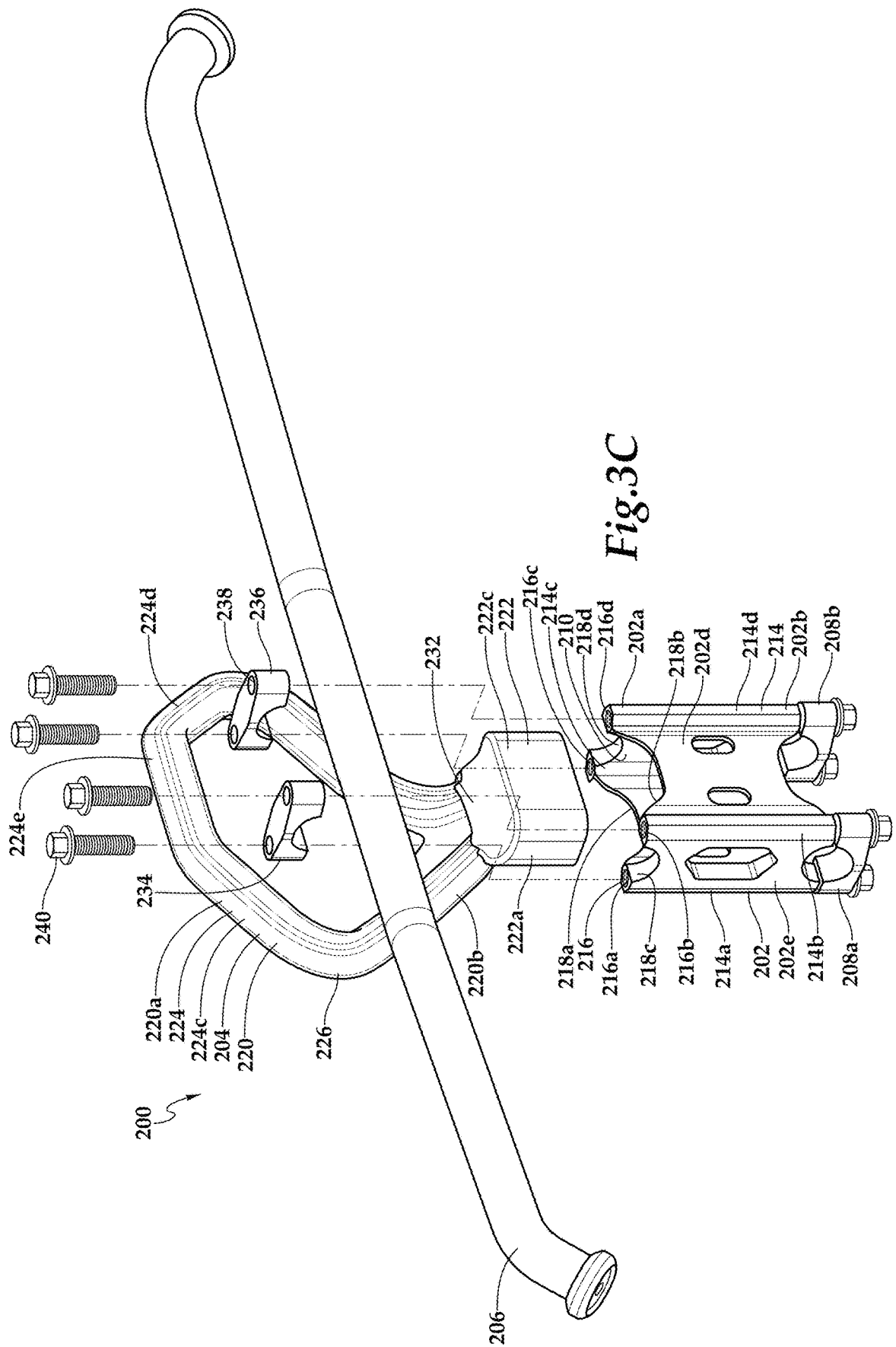
Figure 3D:
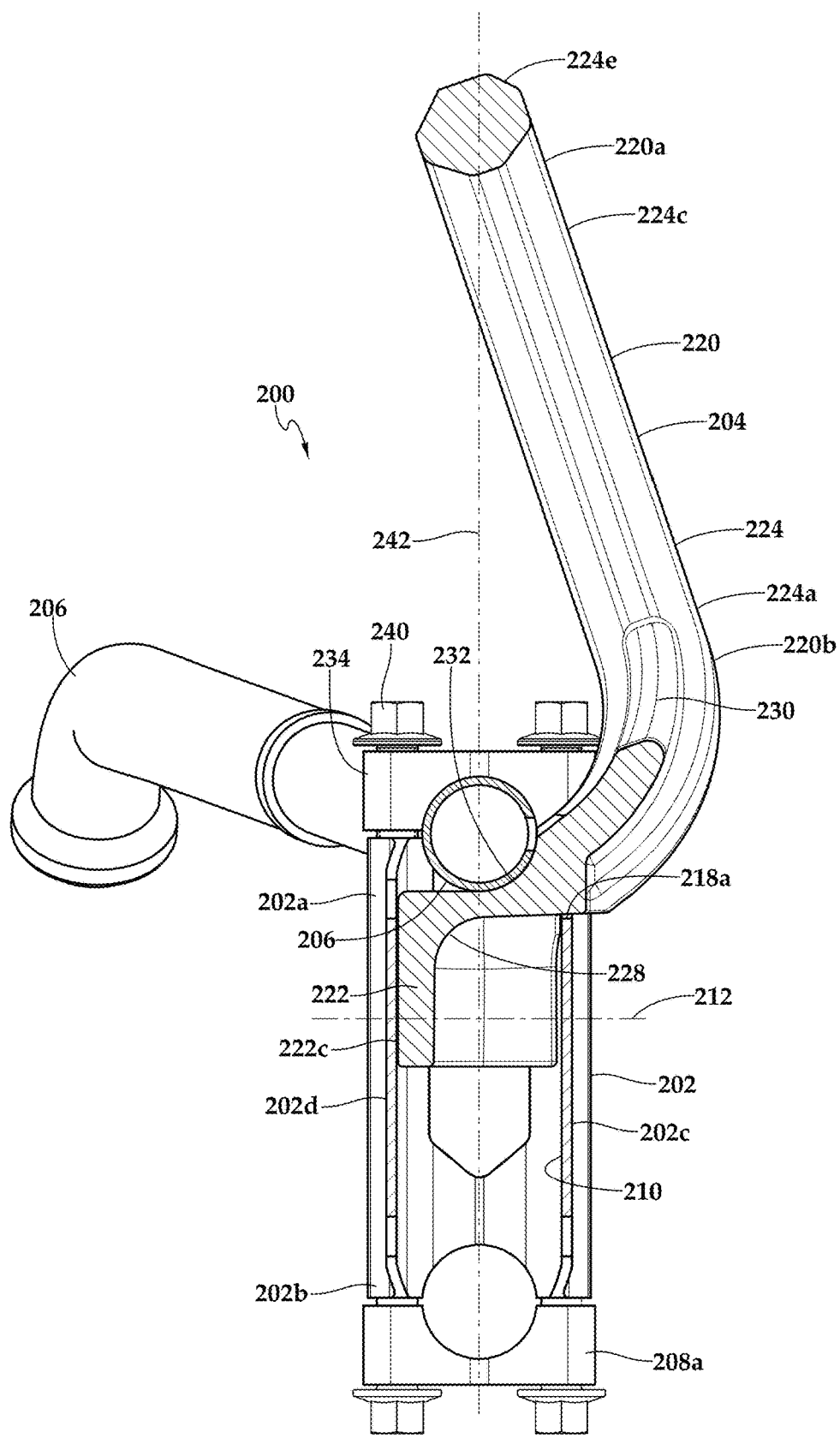
Figure 4:
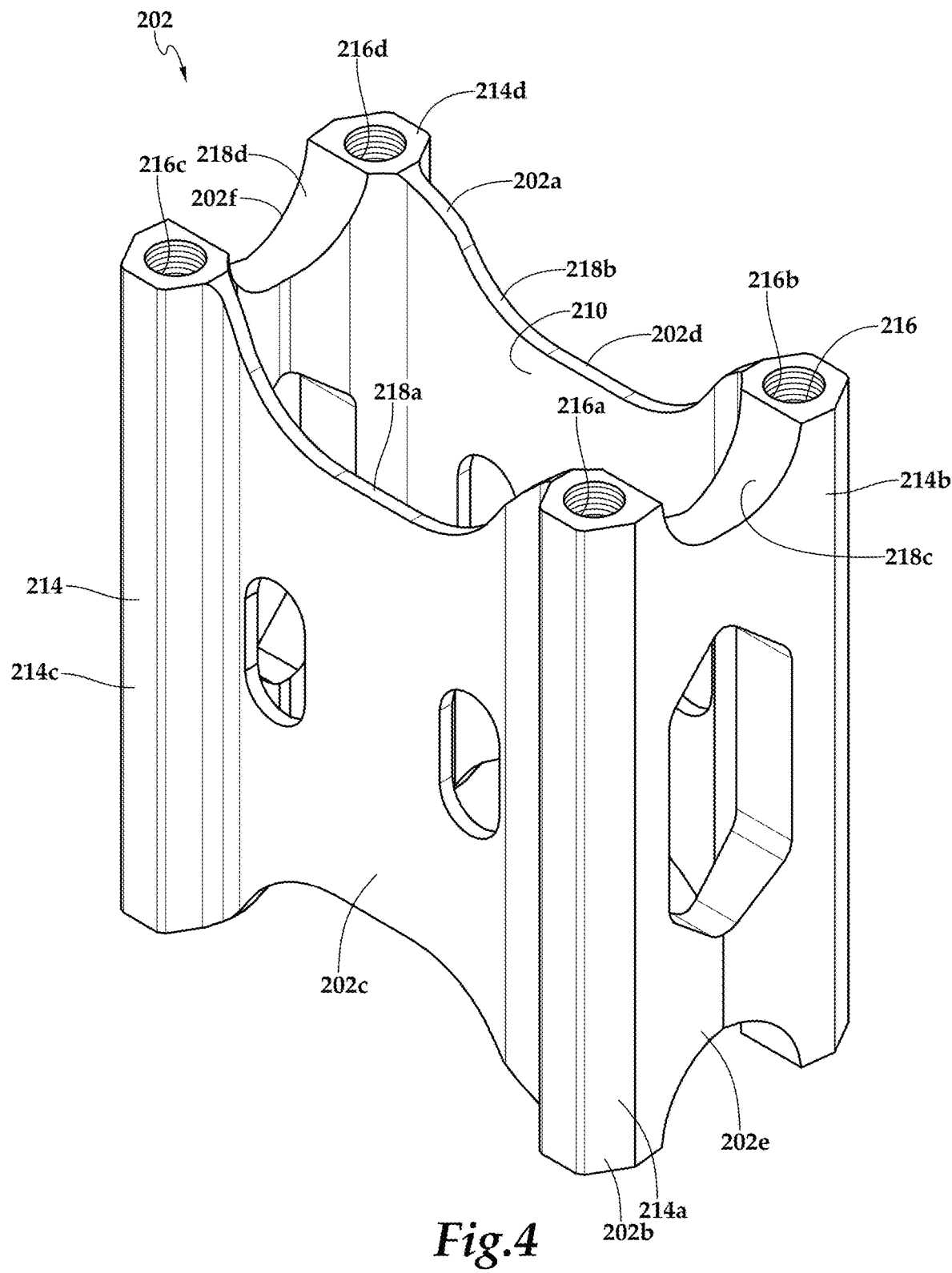
FIG. 4 is an isometric view of a handlebar riser for a snowmobile steering system having a grab handle in accordance with embodiments of the present disclosure.

Referring to FIGS. 3A-3D in the drawings, a handlebar assembly is schematically illustrated and generally designated 200. Handlebar assembly 200 is an example of handlebar assembly 50 in FIGS. 1A-1C and 2A-2C and may be implemented on any vehicle including snowmobile 10 in FIGS. 1A-1C. Handlebar assembly 200 includes handlebar riser 202, grab handle 204 and handlebars 206. Referring additionally to FIG. 4 in the drawings, handlebar riser 202 has a top end 202a and a bottom end 202b. Bottom end 202b of handlebar riser 202 is coupled to the top end of a steering column such as top end 52a of steering column 52 in FIG. 2C using clamps 208a, 208b. Handlebar riser 202 defines an internal channel 210 that extends from top end 202a to bottom end 202b of handlebar riser 202 such that handlebar riser 202 forms an open conduit. In other embodiments, internal channel 210 may extend only partially through handlebar riser 202. In the illustrated embodiment, both handlebar riser 202 and internal channel 210 have a substantially rectangular cross-sectional shape when cut along elevational plane 212, although in other embodiments handlebar riser 202 and internal channel 210 may have any cross-sectional shape including a polygonal, circular, elliptical or irregular cross-sectional shape. Handlebar riser 202 may be manufacturing using a metallic material such as steel or aluminum, a polymer or other rigid materials. Handlebar riser 202 includes four posts 214 including a forward left post 214a, an aft left post 214b, a forward right post 214c and an aft right post 214d. The top ends of posts 214 define fastener holes 216. More specifically, forward left post 214a and aft left post 214b define forward left fastener hole 216a and aft left fastener hole 216b, respectively, and forward right post 214c and aft right post 214d define forward right fastener hole 216c and aft right fastener hole 216d, respectively. In some embodiments, fastener holes 216 may be threaded fastener holes. Interconnecting posts 214 are front, aft, left and right sides 202c, 202d, 202e, 202f of handlebar riser 202. The top ends of front and aft sides 202c, 202d of handlebar riser 202 define grooves 218a, 218b. The top ends of left and right sides 202e, 202f of handlebar riser 202 define grooves 218c, 218d that are curved to contour the underside of handlebars 206, which in the illustrated embodiment has a substantially circular cross-section.

Referring additionally to FIGS. 5A-5C in the drawings, grab handle 204 of handlebar assembly 200 includes a closed loop 220 and a base 222 coupled to the bottom end of closed loop 220. In the illustrated embodiment, closed loop 220 and base 222 form a monolithic, or integral, grab handle 204, although in other embodiments closed loop 220 and base 222 may be separate components coupled to one another by any means. Closed loop 220 approximates a polygonal or hexagonal shape and is formed from a number of substantially linear segments 224 including left and right diagonal lower segments 224a, 224b having bottom ends converging to base 222. Closed loop 220 also includes left and right diagonal upper segments 224c, 224d having bottom ends coupled to the top ends of left and right diagonal lower segments 224a, 224b, respectively. The top ends of left and right diagonal upper segments 224c, 224d converge to a flat and substantially horizontal top segment 224e. Linear segments 224a, 224b, 224c, 224d, 224e are joined by curved transitions 226 to reduce jagged edges for a more comfortable hand grip. While the illustrated embodiment shows closed loop 220 to have five segments 224, closed loop 220 may be formed from any number of segments such as three, four, six or more segments. Furthermore, while segments 224 are shown as linear segments, in other embodiments segments 224 may be curved segments. Closed loop 220 may also approximate shapes other than a polygon such as a circular, elliptical or irregular shape. As best seen in FIGS. 3D and 5C with regard to top segment 224e, each segment 224 may have a polygonal cross-sectional shape to reduce hand slippage when grasped by a rider. In the illustrated embodiment, each segment 224 has an octagonal cross-sectional shape, although in other embodiments the cross-sectional shape of each segment 224 may have any number of sides or alternatively may have a circular, elliptical or irregular cross-sectional shape. The cross-sectional shapes of segments 224 may be uniform or non-uniform.

Base 222 of grab handle 204 has left, right and aft sides 222a, 222b, 222c. The front and bottom sides of base 222 defines a cavity 228, the depth 228a of which is more than half the depth 222d of base 222. As best seen in FIG. 3D, base 222 is sized and shaped to fit within internal channel 210 of handlebar riser 202. In particular, the outer perimeter of the cross-sectional shape of base 222 when cut along elevational plane 212 approximates the cross-sectional shape of internal channel 210 when cut along elevational plane 212. In some embodiments, base 222 may be sized to create a friction fit between base 222 and internal channel 210, although in other embodiments a looser fit between base 222 and internal channel 210 may be suitable. Grab handle 204 also includes a support webbing 230 interposed between left and right diagonal lower segments 224a, 224b above base 222. The top side of support webbing 230 is V-shaped so as to not interfere with the grip of a rider. Support webbing 230 is a rigid member that enhances the structural strength of closed loop 220 to prevent breakage under loaded conditions. Grab handle 204 including closed loop 220 and base 222 may be manufactured using any additive, subtractive or formative manufacturing technique including, but not limited to, injection molding, extrusion, machining, 3D printing, laser cutting, stamping, welding or casting as well as others. Grab handle 204 may be formed from any rigid material including polymeric materials such as rubber, fiber reinforced polymer composites, metal alloy, metal or combinations thereof. Non-limiting examples of metals that may be used to form grab handle 204 include steel or aluminum. In some embodiments, grab handle 204 may be formed from an injection molded polymer or molded rubber. In one non-limiting example, grab handle 204 may be formed from an elastomer such as a thermoplastic elastomer. The outer surface of closed loop 220 may be textured, as in the case of textured rubber, to reduce grip slippage and enhance grip comfort of the rider.

To install grab handle 204 in handlebar assembly 200, base 222 is slid or inserted into the top of internal channel 210 of handlebar riser 202. As best seen in FIG. 3D, the bottom of closed loop 220 may come to rest on top of front side 202c of handlebar riser 202 within groove 218a. After base 222 is inserted into internal channel 210 of handlebar riser 202, handlebars 206 are placed atop base 222. The top side of base 222 defines a groove 232 that is curved to contour or cradle the underside of handlebars 206. With base 222 disposed beneath handlebars 206, left and right clamps 234, 236 are applied to secure handlebars 206 and retain base 222 within internal channel 210 of handlebar riser 202. The undersides of clamps 234, 236 are curved to define grooves that contour the top side of handlebars 206. Clamps 234, 236 also define fastener holes 238 though which fasteners 240 may be inserted. Fasteners 240 are inserted through fastener holes 238 in left clamp 234 and forward and aft left fastener holes 216a, 216b on top of handlebar riser 202 to secure left clamp 234 to the top end of handlebar riser 202. Likewise, fasteners 240 are inserted through fastener holes 238 in right clamp 236 and forward and aft right fastener holes 216c, 216d on top of handlebar riser 202 to secure right clamp 236 to the top end of handlebar riser 202. In some embodiments, fasteners 240 have outer threads and are screwed into fastener holes 216, which may have inner threads. With clamps 234, 236 thus secured, handlebars 206 is interposed between clamps 234, 236 and handlebar riser 202 and handlebars 206 securely retains base 222 of grab handle 204 within internal channel 210 of handlebar riser 202 without the need to directly fasten grab handle 204 to handlebar riser 202, handlebars 206 or other components of handlebar assembly 200 with fasteners. In contrast to some current grab handles, grab handle 204 also need not be directly molded onto adjacent components such as handlebar riser 202 or handlebars 206. In addition, clamps 234, 236 are used to secure handlebars 206 to handlebar riser 202 regardless of whether grab handle 204 is present on the vehicle. Because the same clamps 234, 236 are used with or without grab handle 204, the cost and number of parts required to install grab handle 204 on the vehicle is reduced and grab handle 204 is more easily installed or removed from the vehicle.

Once handlebar assembly 200 including handlebar riser 202, grab handle 204 and handlebars 206 is fully assembled, top segment 224e of closed loop 220 is substantially parallel to handlebars 206. As best seen in FIG. 3D, once installed, closed loop 220 has a tilted configuration such that upper section 220a of closed loop 220 is aft of lower section 220b of closed loop 220. Lower section 220b of closed loop 220 extends forward from the top of base 222 and protrudes from front side 202c of handlebar riser 202 via groove 218a. Lower section 220b of closed loop 220 also has a curved profile that is forward of handlebars 206 and curves aftward toward upper section 220a of closed loop 220 so that closed loop 220 curves back toward the rider of the vehicle for easier access. Top segment 224e of closed loop 220 is substantially vertically aligned with handlebars 206 and base 222 of grab handle 204 such that top segment 224e, handlebars 206 and base 222 lie along a common lateral plane 242. When base 222 resides in internal channel 210 of handlebar riser 202, cavity 228 provides clearance for other components that may also be disposed in handlebar riser 202 such as the top end of the steering column.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. For example, numerous combinations of the features disclosed herein will be apparent to persons skilled in the art including the combining of features described in different and diverse embodiments, implementations, contexts, applications and/or figures. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A steering system for a vehicle, the steering system comprising:
a steering column having a top end;
a handlebar riser having a top end, the handlebar riser coupled to the top end of the steering column and defining an internal channel;
a grab handle including a closed loop having a bottom end and a base coupled to the bottom end of the closed loop, the base insertable into the internal channel of the handlebar riser; and
handlebars coupled to the top end of the handlebar riser over the base of the grab handle, thereby securing the grab handle to the handlebar riser.

2. The steering system as recited in claim 1 wherein, the grab handle is formed from a thermoplastic elastomer.

3. The steering system as recited in claim 1 wherein, the closed loop of the grab handle protrudes from a front side of the handlebar riser.

4. The steering system as recited in claim 1 wherein, the closed loop of the grab handle has a tilted configuration such that an upper section of the closed loop is aft of a lower section of the closed loop.

5. The steering system as recited in claim 1 wherein, the closed loop of the grab handle has a lower section having a curved profile extending forward from the base of the grab handle and curving aftward toward an upper section of the closed loop.

6. The steering system as recited in claim 1 wherein, the closed loop of the grab handle comprises a flat top segment.

7. The steering system as recited in claim 6 wherein, the flat top segment is substantially parallel to the handlebars.

8. The steering system as recited in claim 1 wherein, the closed loop of the grab handle has a lower section forward of the handlebars.

9. The steering system as recited in claim 1 wherein, the closed loop of the grab handle has a lower section including a support webbing.

10. The steering system as recited in claim 1 wherein, the closed loop of the grab handle is formed from a plurality of segments, the plurality of segments comprising:
left and right diagonal lower segments having bottom ends converging to the base of the grab handle;
left and right diagonal upper segments having bottom ends coupled to top ends of the left and right diagonal lower segments, respectively; and
a top segment;
wherein, top ends of the diagonal upper segments converge to the top segment.

11. The steering system as recited in claim 1 wherein, the closed loop of the grab handle is formed from a plurality of segments each having a polygonal cross-sectional shape.

12. The steering system as recited in claim 1 wherein, the base of the grab handle has a top side defining a groove curved to contour a bottom side of the handlebars.

13. The steering system as recited in claim 1 wherein, the base of the grab handle defines a cavity.

14. The steering system as recited in claim 1 further comprising one or more clamps coupled to the top end of the handlebar riser such that the handlebars are interposed between the one or more clamps and the handlebar riser.

15. The steering system as recited in claim 14 wherein, each clamp has a bottom side curved to contour a top side of the handlebars.

16. The steering system as recited in claim 14 wherein, the top end of the handlebar riser defines one or more left fastener holes and one or more right fastener holes;
wherein, the one or more clamps comprises a left clamp and a right clamp each defining one or more fastener holes; and
wherein, the steering system further comprises one or more left fasteners insertable through the one or more fastener holes of the left clamp and the one or more left fastener holes of the handlebar riser and one or more right fasteners insertable through the one or more fastener holes of the right clamp and the one or more right fastener holes of the handlebar riser, thereby coupling the clamps to the top end of the handlebar riser.

17. A snowmobile comprising:
a forward frame assembly;
a steering system coupled to the forward frame assembly, the steering system comprising:
a steering column having a top end;
a handlebar riser having a top end, the handlebar riser coupled to the top end of the steering column and defining an internal channel;
a grab handle including a closed loop having a bottom end and a base coupled to the bottom end of the closed loop, the base insertable into the internal channel of the handlebar riser; and
handlebars coupled to the top end of the handlebar riser over the base of the grab handle, thereby securing the grab handle to the handlebar riser.

18. The snowmobile as recited in claim 17 wherein, the grab handle including the closed loop and the base is a monolithic component.

19. The snowmobile as recited in claim 17 wherein, the grab handle is formed from an injection molded polymer.

20. The snowmobile as recited in claim 17 wherein, the closed loop of the grab handle comprises a top segment substantially vertically aligned with the base of the grab handle and the handlebars such that the top segment, the base and the handlebars lie along a common lateral plane.

* * * * *